(12) United States Patent
Dray et al.

(10) Patent No.: US 9,279,502 B2
(45) Date of Patent: Mar. 8, 2016

(54) FILL VALVE APPARATUS

(71) Applicant: Fives Bronx, Inc., North Canton, OH (US)

(72) Inventors: Edward Dray, Uniontown, OH (US); David E. Harhay, Uniontown, OH (US); Naethan Eagles, Dublin, OH (US); Christopher Scott Eddinger, Lake Milton, OH (US)

(73) Assignee: FIVES BRONX, INC., North Canton, OH (US)

( * ) Notice: Subject to any disclaimer, the term of this patent is extended or adjusted under 35 U.S.C. 154(b) by 99 days.

(21) Appl. No.: 14/290,080

(22) Filed: May 29, 2014

(65) Prior Publication Data
US 2015/0211640 A1   Jul. 30, 2015

Related U.S. Application Data

(60) Provisional application No. 61/933,517, filed on Jan. 30, 2014.

(51) Int. Cl.
| | |
|---|---|
| *F17D 3/01* | (2006.01) |
| *F16K 31/122* | (2006.01) |
| *F16K 1/12* | (2006.01) |
| *F15D 1/02* | (2006.01) |
| *G01M 3/00* | (2006.01) |
| *G05D 7/00* | (2006.01) |
| *G01M 3/02* | (2006.01) |

(52) U.S. Cl.
CPC . *F16K 1/12* (2013.01); *F15D 1/025* (2013.01); *G01M 3/00* (2013.01); *G01M 3/022* (2013.01); *G05D 7/00* (2013.01)

(58) Field of Classification Search
CPC ........................................................ F16K 1/12

USPC ............... 251/122, 129.11, 121; 137/599.01, 137/601.13
See application file for complete search history.

(56) References Cited

U.S. PATENT DOCUMENTS

| | | | |
|---|---|---|---|
| RE18,849 E | * | 5/1933 | McClellan et al. ....... F16K 1/12 137/220 |
| 2,026,506 A | | 12/1935 | Binnall |
| 2,061,852 A | | 11/1936 | Schweitzer |
| 2,114,921 A | * | 4/1938 | Gessner .................. F16K 27/02 137/529 |
| 2,133,983 A | * | 10/1938 | Gaston ...................... F16K 1/12 137/219 |
| 2,236,620 A | * | 4/1941 | Cornelius .............. B67D 3/043 251/233 |

(Continued)

FOREIGN PATENT DOCUMENTS

| | | | | |
|---|---|---|---|---|
| DE | 446096 C | * | 6/1927 | ................ F16K 1/12 |
| DE | 577981 C | * | 6/1933 | ................ F16K 1/12 |

(Continued)

*Primary Examiner* — John K Fristoe, Jr.
*Assistant Examiner* — Seth W MacKay-Smith
(74) *Attorney, Agent, or Firm* — Benesch, Friedlander, Coplan & Aronoff, LLP

(57) ABSTRACT

A first valve member has an axis and a first seat surface with a tapered contour facing axially downstream. A second valve member has a second seat surface with a tapered contour facing axially upstream. The second valve member has a closed position in which the second seat surface abuts the first seat surface, and has an open position in which the second seat surface is spaced axially downstream from the first seat surface. The second valve member further has a terminal end portion configured as a nose cone. The nose cone may be located entirely downstream of the second seat surface, and may have a cavity with a drain opening.

6 Claims, 8 Drawing Sheets

(56) References Cited

U.S. PATENT DOCUMENTS

| | | | | |
|---|---|---|---|---|
| 2,267,057 | A | * | 12/1941 | Verner ............... F16K 1/12 251/257 |
| 2,357,965 | A | * | 9/1944 | Mattimore ........... F16K 1/12 137/625.33 |
| 2,364,907 | A | * | 12/1944 | Mattimore ........... F16K 1/12 137/219 |
| 2,869,817 | A | * | 1/1959 | Hornbostel .......... F16K 1/12 137/219 |
| 3,276,473 | A | * | 10/1966 | Lewis ............... F16K 1/12 137/594 |
| 3,317,184 | A | | 5/1967 | Usry |
| 3,322,138 | A | * | 5/1967 | Backman ............. F16K 1/123 137/219 |
| 3,520,324 | A | * | 7/1970 | Santina ............. F16K 1/12 137/219 |
| 4,067,356 | A | * | 1/1978 | Kreuz ............... F16K 1/12 137/527 |
| 4,546,790 | A | | 10/1985 | Huber et al. |
| 4,589,439 | A | * | 5/1986 | Steingass ........... A62C 31/02 137/219 |
| 4,593,881 | A | * | 6/1986 | Yoshino ............. F25B 41/062 251/124 |
| 4,707,278 | A | * | 11/1987 | Breyer .............. F16J 15/3204 251/118 |
| 5,209,259 | A | | 5/1993 | Dear et al. |
| 5,503,363 | A | * | 4/1996 | Wallace ............. F16K 1/38 138/45 |
| 5,878,992 | A | | 3/1999 | Edwards et al. |
| 5,996,619 | A | | 12/1999 | Saur et al. |
| 6,186,470 | B1 | | 2/2001 | Officier |
| 7,044,434 | B2 | | 5/2006 | Brinks et al. |
| 7,121,291 | B2 | * | 10/2006 | Sueda ............... F16K 15/021 137/1 |
| 8,038,121 | B2 | | 10/2011 | Gessaman |
| 8,312,902 | B2 | * | 11/2012 | Mengibar Rivas ...... B67C 3/281 141/192 |
| 2011/0073792 | A1 | | 3/2011 | Allen |
| 2013/0306172 | A1 | * | 11/2013 | Volovec ............. F16K 1/12 137/556 |

FOREIGN PATENT DOCUMENTS

| | | | |
|---|---|---|---|
| DE | 1116487 B | * 11/1961 | ............. F16K 1/12 |
| DE | 3125646 A1 | * 2/1983 | ............. F15D 1/00 |

\* cited by examiner

FILL VALVE APPARATUS

RELATED APPLICATIONS

This application claims the benefit of priority to provisional U.S. patent application 61/933,517, filed Jan. 30, 2014, which is incorporated by reference.

TECHNICAL FIELD

This technology includes a valve and flow control surfaces for promoting laminar flow through the valve.

BACKGROUND

A test apparatus for pipes may have a fill valve for directing a pressurized flow of fluid into a test pipe. The fill valve may be mounted in a conduit defining a fluid flow path from a pump to the valve, and further from the valve to the test pipe. Turbulent conditions in the flow path may entrain air into the fluid, which could interfere with the test.

SUMMARY

In an apparatus comprising an embodiment of the invention, a first valve member has an axis and a first seat surface with a tapered contour facing axially downstream. A second valve member has a second seat surface with a tapered contour facing axially upstream. The second valve member has a closed position in which the second seat surface abuts the first seat surface, and has an open position in which the second seat surface is spaced axially downstream from the first seat surface. The invention provides several flow control features.

For example, the second valve member preferably has a terminal end portion configured as a nose cone. The nose cone may be located entirely downstream of the second seat surface, and may have a cavity with a drain opening to the exterior of the nose cone.

The valve members are preferably spaced apart across an annular flow area when the second valve member is in the open position, and the second valve member preferably has radially projecting vanes that reach axially across the annular flow area.

The apparatus may further include a third valve member having an inner surface that surrounds the second valve member with a contour that is tapered radially outward from a downstream edge of the first seat surface.

In a distinct embodiment of the invention, a flow guide has a body with a central axis and axially opposite inlet and outlet ends. A cylindrical surface portion of the body reaches axially from the inlet end. A tapered surface portion reaches axially and radially outward from the cylindrical surface portion toward the outlet end.

A cylindrical wall of the flow guide surrounds a tubular fluid flow path that reaches over the body. The cylindrical wall has an outlet end spaced axially upstream from the outlet end of the body. This provides the tubular flow path with an outlet flow area facing radially outward. A plurality of vanes project radially outward from the flow guide body in circumferentially spaced-apart positions to divide the tubular flow path into arcuate segments. Each vane projects radially outward to the cylindrical wall, and also projects radially outward to the outlet flow area.

In another distinct embodiment, a conduit structure defines a fluid flow path with a section centered on a first axis, a section centered on a second axis perpendicular to the first axis, and a turn between the sections. A pair of opposed valve members are relatively movable along the first axis between a closed condition blocking the flow path and an open condition spaced apart across a flow area in the flow path. A stem is connected between the valve members to move the valve members between the open and closed conditions. A flow directing structure has a bore through which the stem reaches from an actuator to the flow path, and has a planar surface that surrounds an opening from which the stem projects from the bore into the turn in the flow path. The planar surface faces into the flow path at an acute angle to the first and second axes.

DETAILED DESCRIPTION

Figure 1:
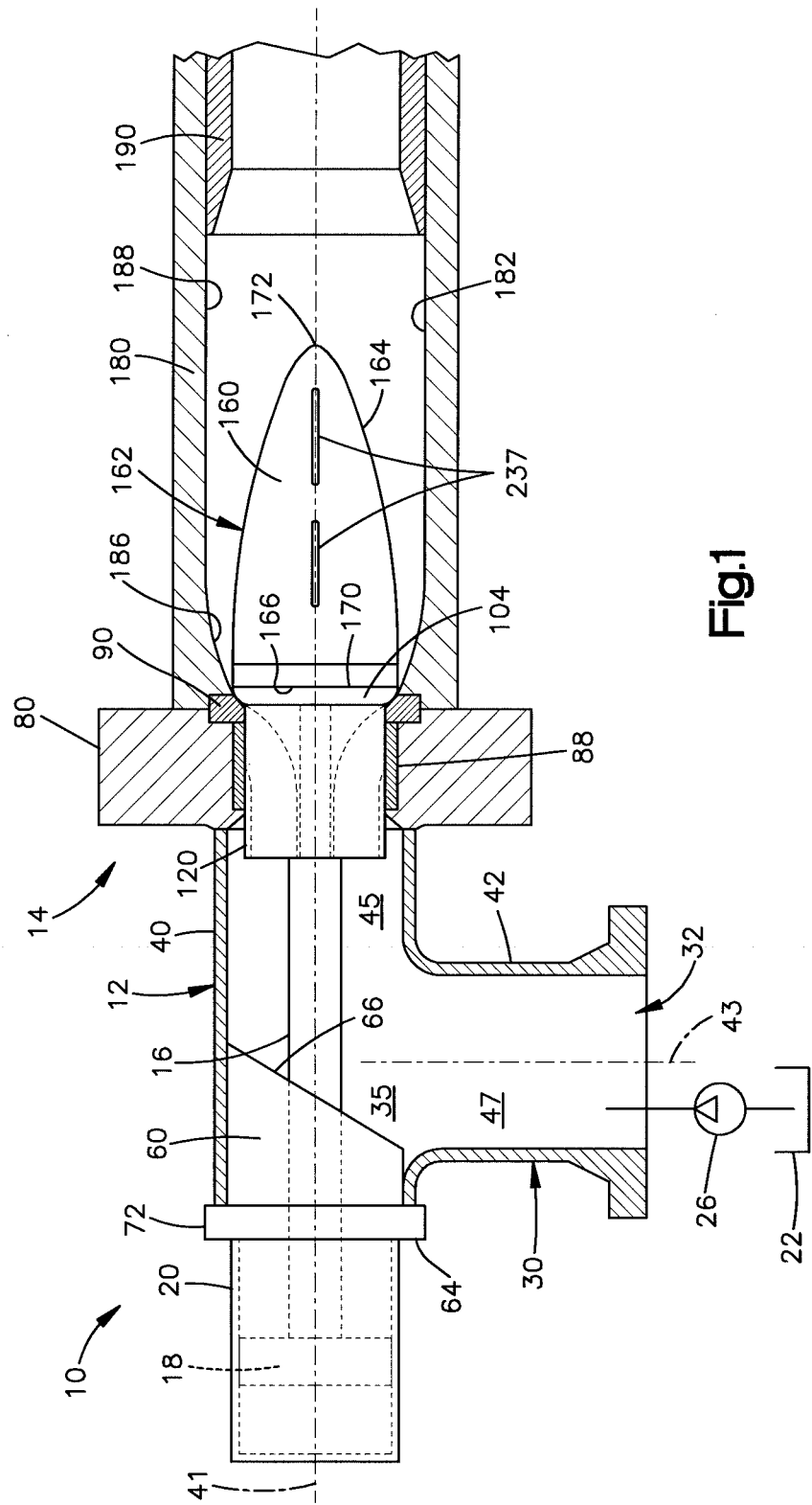
FIG. 1 is a side view, partly in section, of an apparatus including a conduit structure and a valve.

The apparatus shown in the drawings has parts that are examples of the elements recited in the claims. The illustrated apparatus thus includes examples of how a person of ordinary skill in the art can make and use the claimed invention. It is described here to meet the enablement and best mode requirements of the patent statute without imposing limitations that are not recited in the claims.

Figure 2:
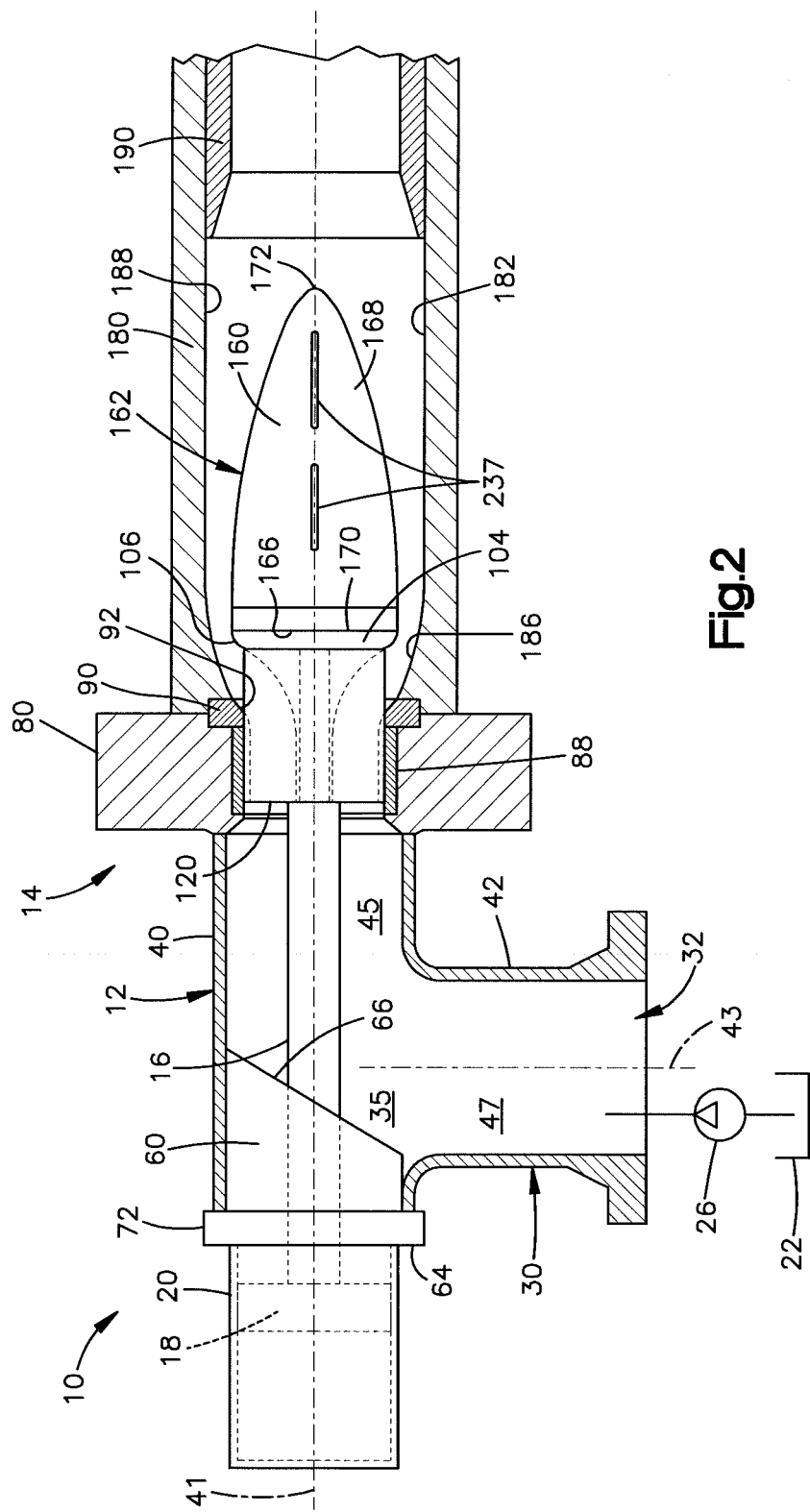
FIG. 2 is a view similar to FIG. 1, showing parts in different positions.

As shown partially in FIGS. 1 and 2, an apparatus 10 includes a conduit structure 12 and a valve 14. The valve 14 has a stem 16 connected as a rod for a piston 18 in an actuator 20. The actuator 20 moves the piston 18 and the stem 16 to shift the valve 14 between a closed condition, as shown in FIG. 1, and an open condition, as shown in FIG. 2. When the valve 14 is in the open condition, it permits water from a source 22 to flow through the conduit structure 12 under the influence of a pump 26.

The parts of the conduit structure 12 that are shown in FIG. 1 include a T-shaped part 30 with an inlet 32. The T-shaped part 30 defines a flow path with a turn 35 between the inlet 32 and the valve 14. In the illustrated example, the T-shaped part 30 has a first cylindrical section 40 centered on a first axis 41, and has a second cylindrical section 42 centered on a second axis 43 perpendicular to the first axis 41. The first and second sections 40 and 42 of the T-shaped part 30 intersect at the turn 35 to define respective orthogonal sections 45 and 47 of the flow path downstream and upstream of the turn 35.

Figure 4:
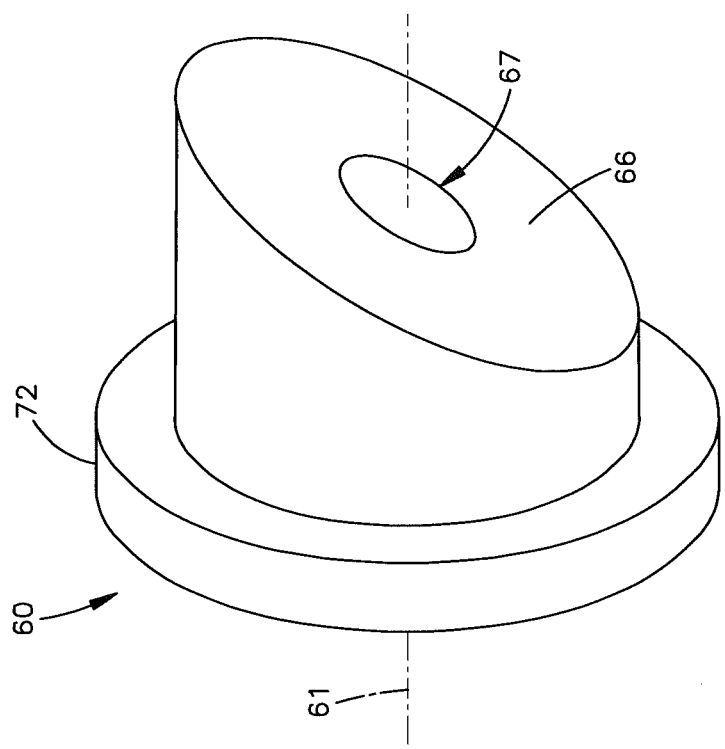
FIG. 4 is a perspective view of the part shown in FIG. 3.
Figure 3:
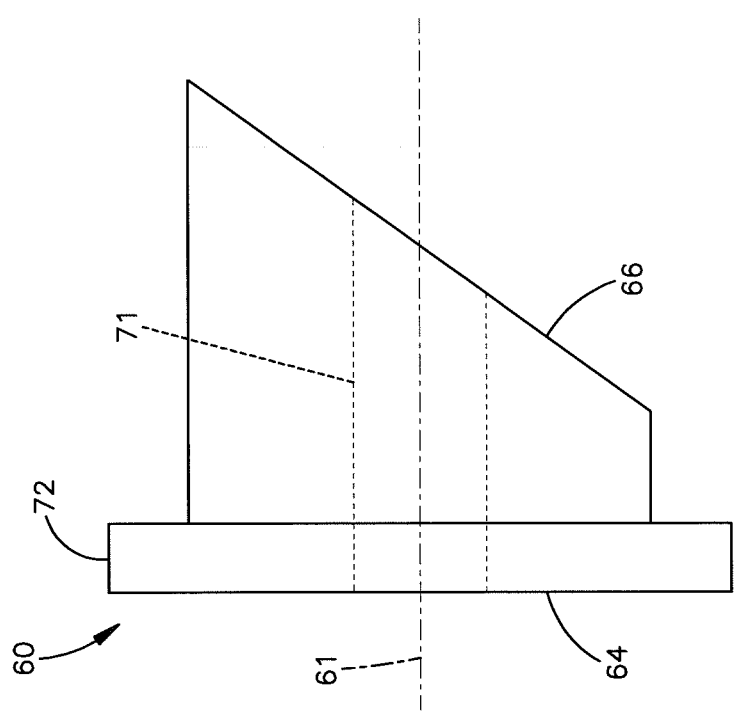
FIG. 3 is a side view of a part shown in FIG. 1.

A flow directing structure 60 is located at the turn 35 in the flow path. As show separately in FIGS. 3 and 4, the flow directing structure 60 in the illustrated example is a circular cylinder with a central axis 61 and planar opposite end surfaces 64 and 66. Each end surface 64 and 66 has an opening 67 where a bore 71 reaches through along the axis 61. A circular mounting flange 72 projects radially at one end surface 64.

The opposite end surface 66 is shaped as an elliptical cylindric section. That end surface 66 lies in a plane at an acute angle to the axis 61.

Referring again to FIG. 1, the flow directing structure 60 is installed coaxially within the first section 40 of the T-shaped part 30 to close the first section 40 at its upstream end. The stem 16 reaches through the bore 71 from the actuator 20 to the flow path. The elliptical end surface 66 of the flow directing structure 60 is located at the turn 35 in the flow path, and is oriented to face both downstream into the first section 45 of the flow path and upstream into the second section 47 of the flow path. The elliptical end surface 66 thus defines an outer boundary of the turn 35 at an acute angle to each of the two perpendicular axes 41 and 43 of the flow path.

Figures 5, 6:
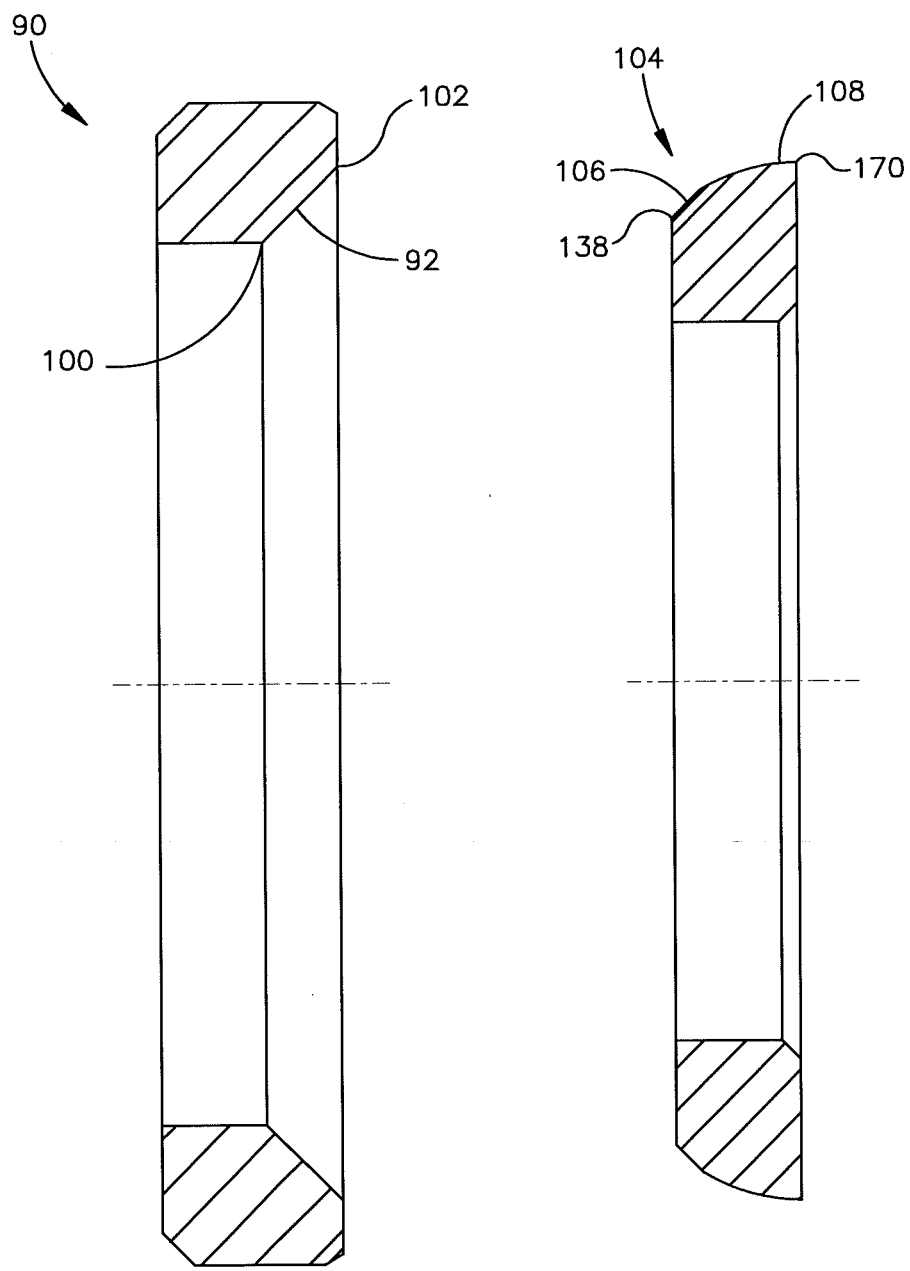
FIG. 5 is a side sectional view of a part shown in FIG. 1.
FIG. 6 is a side sectional view of another part shown in FIG. 1.

The parts of the valve 14 that are shown in FIG. 1 include a flange 80 that is mounted on the conduit structure 12. A cylindrical bushing 88 and a valve ring 90, both of which are centered on the axis 41, are fixed to the flange 80. As shown in FIG. 5, the fixed ring 90 has an annular valve seat surface 92 with a tapered contour facing radially inward and axially downstream. The fixed seat surface 92 preferably has an upstream edge 100, a downstream edge 102, and a linear radial profile fully between the upstream and downstream edges 100 and 102.

A movable valve ring 104 is located radially inward of the fixed ring 90, and is connected to the stem 16 for movement axially relative to the fixed ring 90. As shown in FIG. 6, the movable ring 104 has a tapered annular valve seat surface 106. The movable seat surface 106 also has a linear radial profile, but is tapered oppositely to face radially outward and axially upstream toward the fixed seat surface 92. An annular fluid guide surface 108 on the movable ring 104 has an arcuate radial profile reaching radially outward and axially downstream from the movable seat surface 106.

Figure 7:
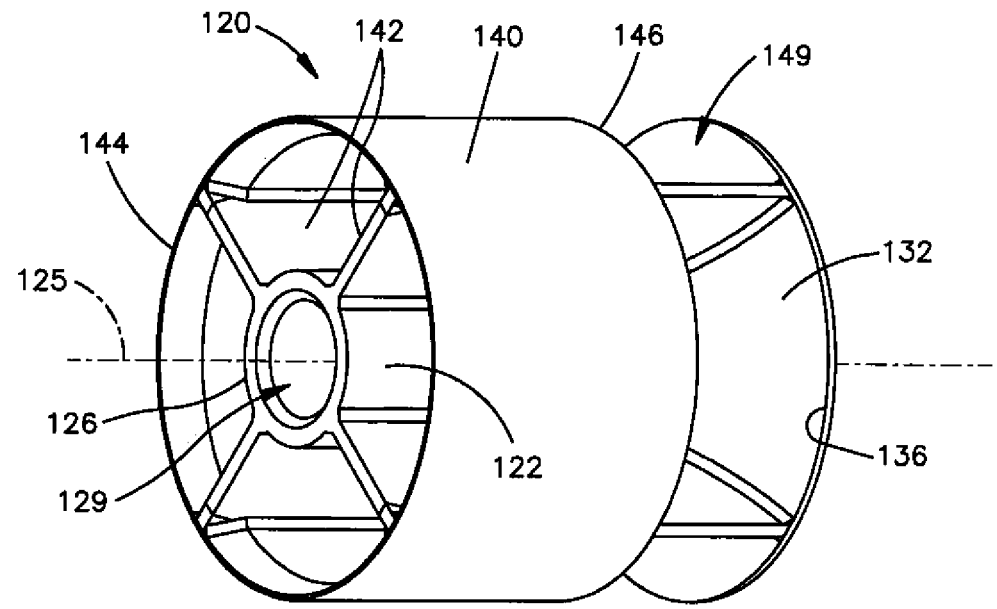
FIG. 7 is a perspective view of a part shown in FIG. 1.
Figure 8:
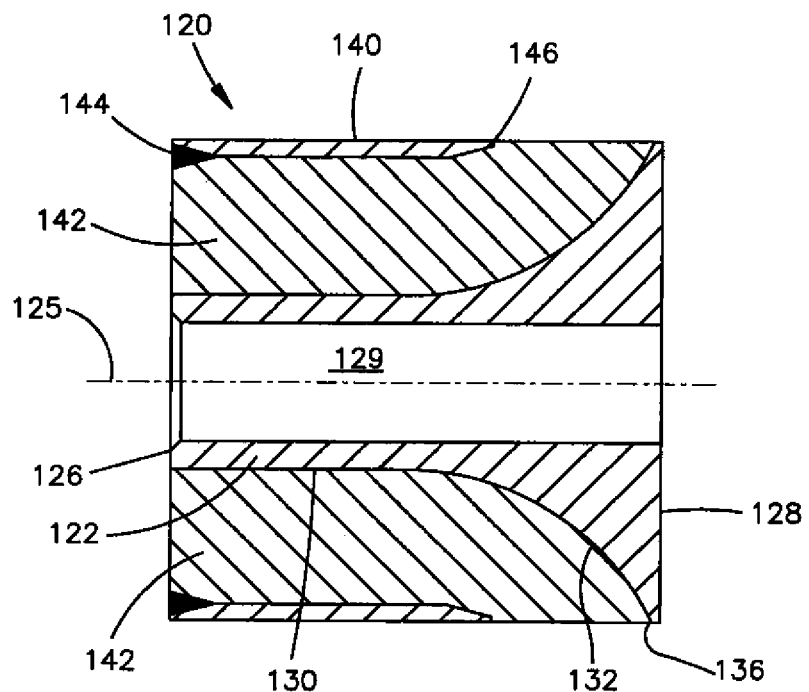
FIG. 8 is a side sectional view of the part shown in FIG. 7.

A flow guide 120 is mounted on the stem 16 adjacent to the movable ring 104. As shown separately in FIGS. 7 and 8, the flow guide 120 includes a body 122 with a central axis 125 and axially opposite inlet and outlet ends 126 and 128. A central bore 129 reaches through the body 122 for mounting the flow guide 120 on the stem 16. A cylindrical surface portion 130 of the body 122 reaches axially from the inlet end 126 partially toward the outlet end 128. A tapered surface portion 132, which preferably has an arcuate radial profile, reaches axially and radially outward from the cylindrical surface portion 130 fully to the outlet end 128. The tapered surface portion 132 thus has a radially outer edge 136 closely adjacent to a radially inner edge 138 (FIG. 6) of the movable seat surface 106.

The flow guide 120 further includes a cylindrical wall 140 and vanes 142. The wall 140 is received over the body 122 to surround a tubular flow path that reaches over the body 122. Preferably, the wall 140 has an inlet end 144 axially adjacent to the inlet end 126 of the body 122, and has an outlet end 146 spaced axially upstream from the outlet end 128 of the body 122. This provides the tubular flow path with an annular outlet flow area 149 for discharging fluid radially outward from the periphery of the flow guide 120.

The vanes 142 reach axially over the body 122 in circumferentially spaced-apart positions, and project radially outward from the body 122 to the cylindrical wall 140 to divide the tubular flow path into arcuate segments. The vanes 142 also project radially outward to the annular flow area 149, and reach axially across the annular flow area 149 from the outlet end 146 of the wall 140 to the outlet end 128 of the body 122.

A nose cone 160 also is mounted on the stem 16. In this arrangement the nose cone 160, the movable ring 104, and the flow guide 120 together define a movable valve seat member 162 that is movable axially with the stem 16. The outer surface 164 of the nose cone 160 is preferably shaped as a paraboloid. In the illustrated example, the outer surface 164 is located entirely downstream of the movable seat surface 106. Preferably, the outer surface 164 also has an upstream edge 166 adjoining a downstream edge 170 of the guide surface 108 (FIG. 6) so as to reach fully from the movable ring 104 to the terminal downstream end 172 of the movable seat member 162.

Figure 9:
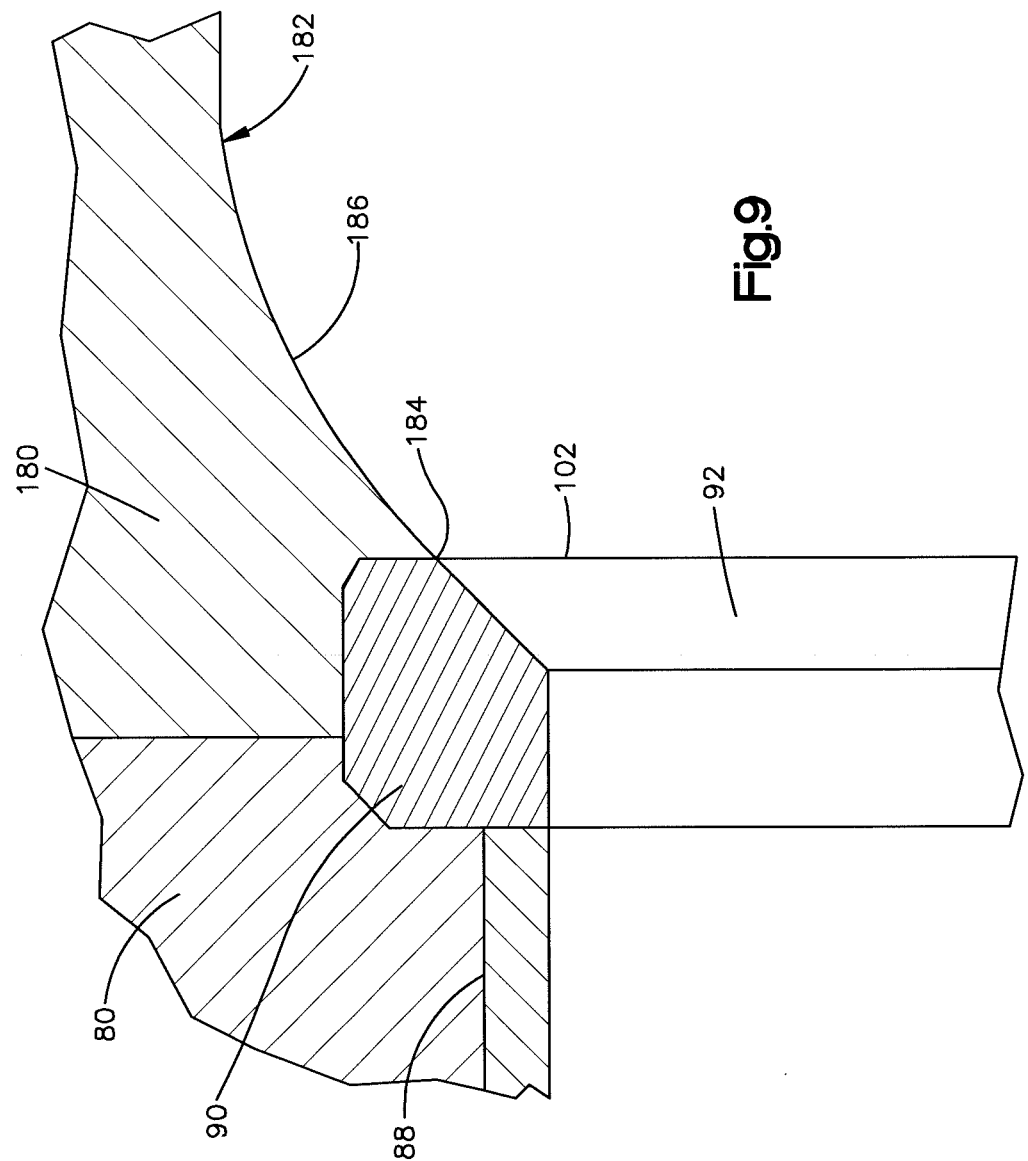
FIG. 9 is an enlarged sectional view of parts shown in FIG. 1.

As further shown in FIG. 1, a housing 180 projects from the flange 80 coaxially over the movable seat member 162. A tubular inner surface 182 of the housing 180 has an upstream edge 184 (FIG. 9) adjacent to the downstream edge 102 of the fixed seat surface 92. The inner surface 182 has a first section 186 reaching downstream from that edge 184 with a tapered contour facing radially inward. The tapered contour in the preferred embodiment has an arcuate radial profile. The inner surface 182 further has a second section 188 (FIG. 1) reaching downstream from the first section 186 with a cylindrical contour centered on the axis 41.

Additional parts of the apparatus 10 include a slip tube assembly for coupling a pipe to the housing 180. As shown partially in FIGS. 1 and 2, such parts include an inner slip tube 190 supported for sliding movement coaxially within the housing 180. As known in the art, other components (not shown) that connect to the inner slip tube 190 shift it axially as well as shifting components axially into and out of sealed engagement with a pipe to be tested under elevated pressure provided by a system of hydraulic circuits and pumps including the pump 26.

When the valve 14 is in the closed condition, the movable seat surface 106 abuts the fixed seat surface 92 to block the flow of water downstream between the two rings 90 and 104. When a user operates the actuator 20 to shift the valve 14 from the closed condition to the open condition, the stem 16 advances to the right as viewed in FIGS. 1 and 2, which shifts the movable seat member 162 axially downstream relative to the surrounding flange 80, bushing 88, fixed ring 90 and housing 180. The stem 16 has a full stroke position in which the movable seat member 162 is spaced a maximum distance downstream from its closed position, as shown in FIG. 2.

As the movable seat member 162 is moved along the axis 41, the movable ring 104 is carried throughout a range of open positions in which the movable seat surface 106 is spaced axially downstream from the fixed seat surface 92 to provide an annular flow area between the rings 90 and 104. The annular flow area is part of a flow path reaching fully through the apparatus 10. Specifically, the flow path reaches from the inlet 32 of the T-shaped part 30 toward and around the turn 35, through the flow guide 120 and the annular flow area between the rings 90 and 104, further over the nose cone 160, and past the terminal downstream end 172 of the movable seat member 162 toward and into the inner slip tube 190 from which the water fills the pipe to be tested.

Several features are provided to avoid turbulence and promote laminar flow along the flow path through the apparatus 10. This helps to avoid the entrainment of air in the pressurized pipe. For example, as compared with a sharp corner, the acute angular orientation of the elliptical surface 66 at the turn 35 directs a more laminar flow of water around the turn 35. The vanes 142 on the flow guide 120 help to avoid turbulence by separating the flow into arcuate segments within the surrounding cylindrical wall 180 and through the outlet flow area 149. The tapered surface portion 132 of the flow guide 120 also helps to avoid turbulence as the flow approaches the outlet area 149.

As the flow continues past the annular flow area between the rings 90 and 104, the arcuate radial profiles of the guide surface 108 and the surrounding inner surface 182 of the housing 180 help to direct the flow radially outward with minimal turbulence. The tapered outer surface 164 of the nose cone 160, which immediately follows the guide surface 108, further helps to avoid turbulence in the flow downstream over and beyond the movable seat member 162.

Figure 10:
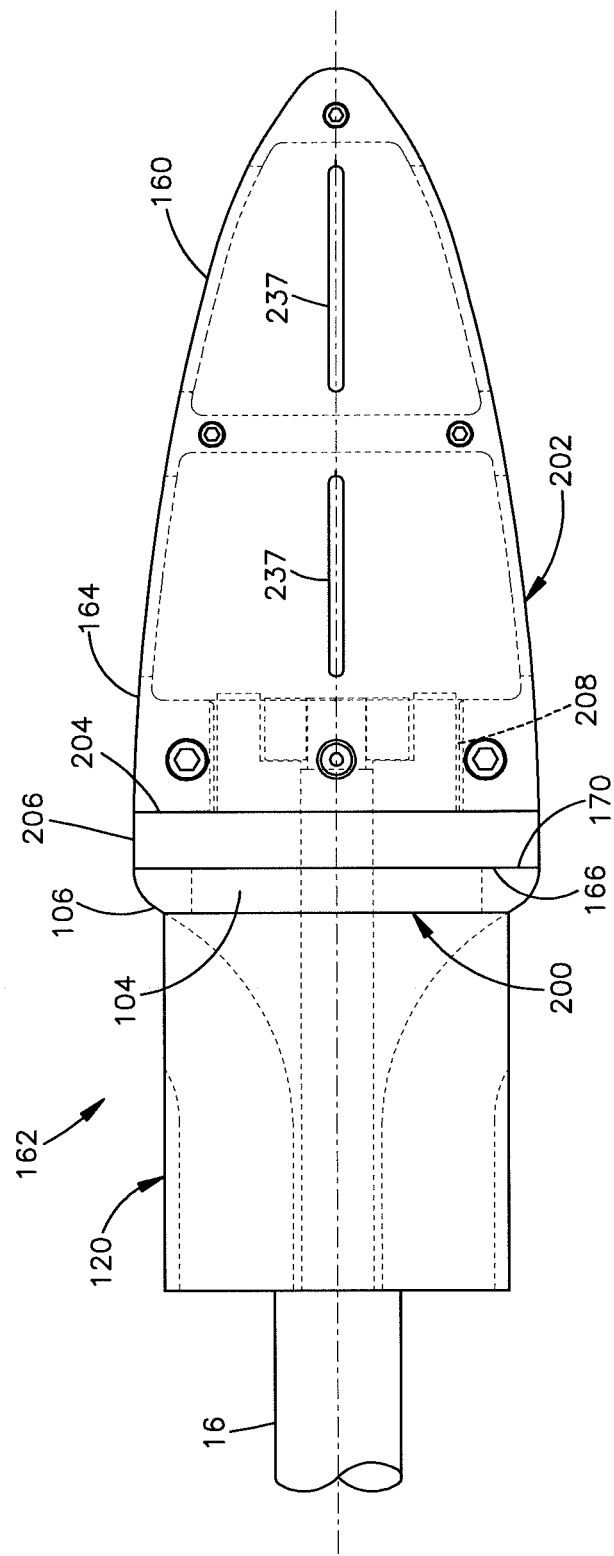
FIG. 10 is an enlarged view of other parts shown in FIG. 1.
Figure 11:
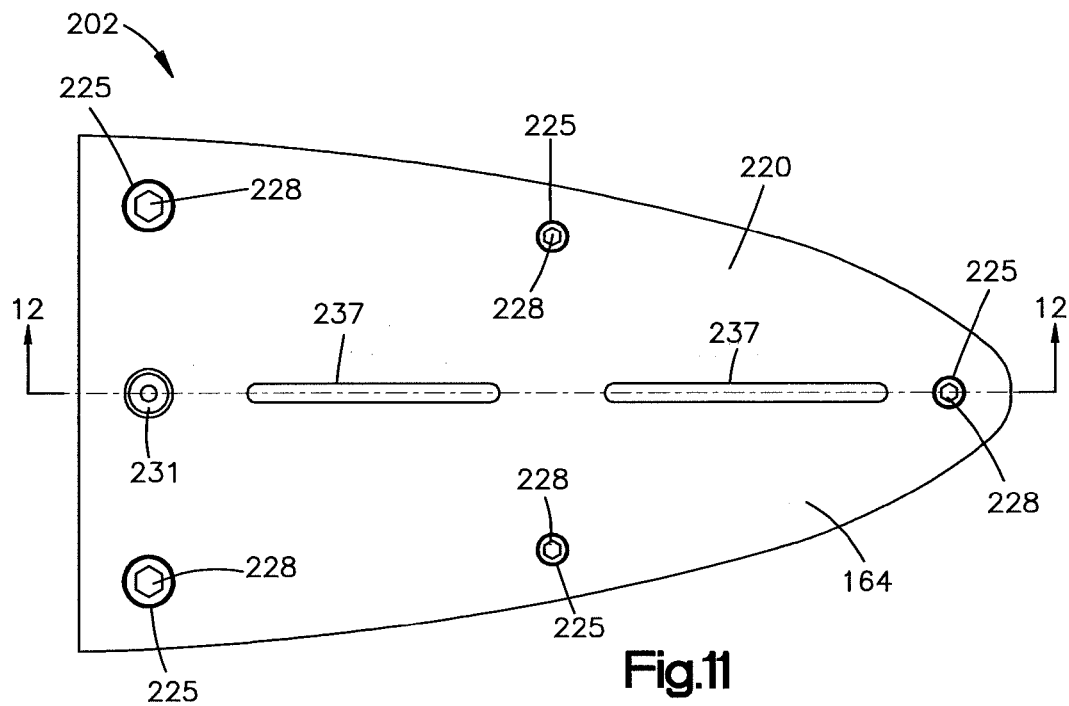
FIG. 11 is a side view of a part shown in FIG. 10.
Figure 12:
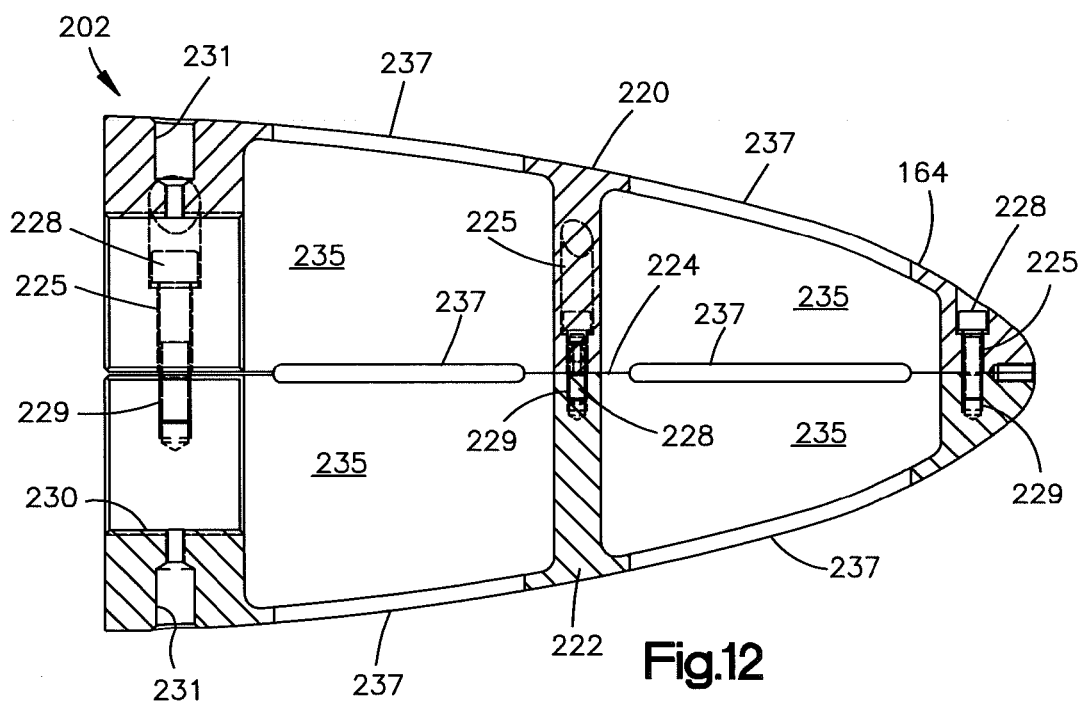
FIG. 12 is a sectional view taken on line 12-12 of FIG. 11.

Additional details of the nose cone 160 are shown in FIGS. 10-12. As shown in FIG. 10, the nose cone 160 includes a base 200 and a shell 202. The base 200 is a generally cylindrical part that is mounted on the end of the stem 16. A flange portion 204 of the base 200 includes an end section 206 of the outer surface 164. A body portion 208 of the base 200 supports the shell 202.

As shown in greater detail in FIGS. 11 and 12, the shell 202 in the illustrated example has two half sections 220 and 222 that are joined along a seam 224. Bores 225 in the first half section 220 receive fasteners 228 that reach into aligned bores 229 in the second half section 222. This fastens the two half sections 220 and 222 together. An annular end portion 230 (FIG. 12) of the shell 202 is received over the body portion 208 of the base 200 (FIG. 10). Each half section 220 and 222 has an additional bore 231 for a fastener (not shown) to fasten the shell 220 to the body portion 208 of the base 200.

As best shown in FIG. 12, the half sections 220 and 222 have cavities 235 that provide the shell 202 with a generally hollow configuration to minimize weight. Since the seam 224 and the bores 225, 229 and 231 provide paths for the ingress of water or other fluid into the cavities 235, the shell 202 is preferably provided with drainage openings 237, which in the illustrated example are formed as axially elongated slots at the outer surface 164.

This written description sets for the best mode of carrying out the invention, and describes the invention so as to enable a person skilled in the art to make and use the invention, by presenting examples of elements recited in the claims. The patentable scope of the invention is defined by the claims, and may include other examples that occur to those skilled in the art. Such other examples, which may be available either before or after the application filing date, are intended to be within the scope of the claims if they have structural or method elements that do not differ from the literal language of the claims, or if they have equivalent structural or method elements with insubstantial differences from the literal language of the claims.

What is claimed is:

1. An apparatus comprising:
   a flow guide body having a central axis, axially opposite inlet and outlet ends, a cylindrical surface portion reaching axially from the inlet end, and a tapered surface portion reaching axially and radially outward from the cylindrical surface portion toward the outlet end;
   a cylindrical wall surrounding a tubular fluid flow path that reaches over the flow guide body, the cylindrical wall having an outlet end spaced axially upstream from the outlet end of the flow guide body to provide the tubular flow path with an outlet flow area facing radially outward; and
   a plurality of vanes projecting radially outward from the flow guide body in circumferentially spaced-apart positions dividing the tubular flow path into arcuate segments, with each of the plurality of vanes projecting radially outward to the cylindrical wall and also projecting radially outward to the outlet flow area.

2. An apparatus as defined in claim 1 wherein each of the plurality of vanes reaches axially across the outlet flow area from the outlet end of the cylindrical wall to the outlet end of the flow guide body.

3. An apparatus as defined in claim 1 wherein the tapered surface portion of the flow guide body has an arcuate radial profile.

4. An apparatus comprising:
   a conduit structure defining a fluid flow path with a section centered on a first axis, a section centered on a second axis orthogonal to the first axis, and a turn between the sections;
   a pair of opposed valve members that are relatively movable along the first axis between a closed condition blocking the flow path and an open condition spaced apart across a flow area in the flow path;
   a stem connected between the valve members to move the valve members between the open and closed conditions;
   an actuator for moving the stem; and
   a flow directing structure having a bore through which the stem reaches from the actuator to the flow path, and having a planar turn surface that surrounds an opening from which the stem projects from the bore into the turn in the flow path, with the planar turn surface facing into the flow path at acute angles to the first and second axes.

5. An apparatus as defined in claim 4 wherein the planar turn surface is elliptical.

6. An apparatus as defined in claim 4 wherein the flow directing structure comprises a circular cylinder upon which the planar turn surface is an end surface shaped as a cylindric section.

* * * * *